United States Patent [19]

Micale et al.

[11] Patent Number: 4,945,121
[45] Date of Patent: * Jul. 31, 1990

[54] THERMOSETTING DYED LATEX COLORANT DISPERSIONS

[75] Inventors: Fortunato J. Micale, Bethlehem; Garry T. Gwozdz, Nazareth, both of Pa.

[73] Assignee: Koh-I-NOOR Radiograph, Inc., Bloomsbury, N.J.

[*] Notice: The portion of the term of this patent subsequent to May 12, 2004 has been disclaimed.

[21] Appl. No.: 86,741

[22] Filed: Aug. 18, 1987

[51] Int. Cl.$^5$ .................. C08L 63/00; C08K 3/20
[52] U.S. Cl. .................. 523/339; 523/402; 523/412; 523/414
[58] Field of Search .............. 523/402, 414, 339

[56] References Cited

U.S. PATENT DOCUMENTS

| | | |
|---|---|---|
| 2,954,358 | 9/1960 | Hurwitz . |
| 3,016,308 | 1/1962 | Macaulay . |
| 3,390,114 | 6/1968 | Uhl et al. . |
| 3,575,882 | 4/1971 | Vandegaer et al. . |
| 3,577,515 | 3/1968 | Vandegaer . |
| 3,900,669 | 8/1975 | Kiritani . |
| 3,996,061 | 12/1976 | Johnson . |
| 4,010,038 | 3/1977 | Iwasaki et al. . |
| 4,029,620 | 6/1977 | Chen . |
| 4,070,323 | 1/1978 | Vanderhoff et al. . |
| 4,123,403 | 10/1978 | Warner et al. . |
| 4,200,667 | 4/1980 | Lee et al. . |
| 4,222,918 | 9/1980 | Zentner et al. . |
| 4,230,495 | 10/1980 | Lee et al. . |
| 4,264,700 | 4/1981 | Bayley . |
| 4,268,411 | 5/1981 | Iwata et al. . |
| 4,309,213 | 1/1982 | Graber et al. . |
| 4,330,460 | 5/1982 | Hoffend et al. . |
| 4,339,337 | 7/1982 | Tricot et al. . |
| 4,358,388 | 11/1982 | Daniel et al. . |
| 4,407,985 | 10/1983 | Muller . |
| 4,413,071 | 11/1983 | Wistuba ........................ 523/414 |
| 4,421,660 | 12/1983 | Hajna . |
| 4,471,079 | 9/1984 | Enami . |
| 4,509,982 | 4/1985 | Iijima . |
| 4,524,161 | 6/1985 | Feuerhahn ..................... 523/414 |
| 4,525,525 | 6/1985 | Höfer et al. . |
| 4,530,961 | 7/1985 | Nguyen et al. . |
| 4,532,276 | 7/1985 | Knäble et al. . |
| 4,543,376 | 9/1985 | Schupp et al. . |
| 4,543,382 | 9/1985 | Tsuchida et al. . |
| 4,588,757 | 5/1986 | Minnis et al. . |
| 4,593,078 | 6/1986 | Kooymans et al. . |
| 4,596,844 | 6/1986 | Ohsawa et al. . |
| 4,598,108 | 6/1986 | Hoefs . |
| 4,599,114 | 7/1986 | Atkinson . |
| 4,605,564 | 7/1986 | Kulla et al. . |
| 4,608,401 | 7/1986 | Martin . |
| 4,620,878 | 11/1986 | Gee . |
| 4,692,188 | 9/1987 | Ober et al. . |

FOREIGN PATENT DOCUMENTS 163  6/1983  European Pat. Off. .......... 523/414

OTHER PUBLICATIONS

Kuhn, Universally Fugitive Tints, Proceedings of Amer. Assoc. of Textile Chemists and Colorists(1965).
Spalding, Encapsulated Pigment for Latex Paint, Chemical Week, (Sep. 3, 1986).

*Primary Examiner*—John C. Bleutge
*Assistant Examiner*—David W. Woodward
*Attorney, Agent, or Firm*—Fitzpatrick, Cella, Harper & Scinto

[57] ABSTRACT

Process characterized by dissolving a dye in a solution of organic solvent and an epoxy type polymer, which requires a curing agent in order to create a resultant nanosphere that will crosslink through the action of the curing agent, and not simply as the result of a solvent removal which defined each nanosphere. The dye may be in concentration range of 1% to 50% by weight of solvent, and the organic solvent must have limited solubility in water, typically less than 20%. An initial intermolecular mixing step dissolves dye and epoxy resin within a solvent so as to make a homogeneous solvent-/polymer/dye intermediate mixture, that then is dispersed as nanoparticles in water, and thereafter crosslinked. Surfactants may be used to assist in dispersing the dye/polymer/solvent solution into the water continuous phase.

13 Claims, No Drawings

THERMOSETTING DYED LATEX COLORANT DISPERSIONS

BACKGROUND OF THE INVENTION

This invention is related to two commonly assigned applications by one of the coinventors herein, entitled PIGMENT ENCAPSULATED LATEX AQUEOUS COLORANT DISPERSIONS, Ser. No. 06/842,609, now U.S. Pat. No. 4,665,107, and ELECTROPHORETIC DISPLAY PARTICLES AND A PROCESS FOR THEIR PREPARATION, Ser. No. 06/842,608, which were filed Mar. 21, 1986.

1. Field of the Invention

The present invention involves specific improvements to the known concept of combining a dye, which is a molecular coloring agent, with the molecules of a particular form of polymer, for the purpose of making submicron sized particles of polymer (hereafter "nanoparticles" or "nanospheres") with the dye molecules in a homogeneous mix.

2. Brief Description of the Prior Art

The present invention relates to dye molecules, which are not encapsulated as solid cores within a polymer shell. The present invention, therefore, is in categorical distinction to the pigment encapsulated latex teachings presented in the two above-identified applications. The embodiments of the present invention improve upon the known concept of molecular mixing of a dye homogeneously throughout a polymer, through the specific improvement of an epoxy based thermoset polymer system, whereupon any crosslinking can be made selectively to occur upon the selective addition of heat, or catalyst, after nanospheres of dyed polymer have been created by a solvent removal step.

The categories of dyes useful with the present invention are those that are water insoluble, and soluble within certain solvents for the polymer. At least the dye and epoxy resin first are dissolved together in a mutual solvent in order to create a solution of dye and resin, which then is dispersed as a discontinuous phase of nanodrops in an aqueous continuous phase. The degree of emulsification is assisted by the use of surfactants and other forms of dispersing agents.

There are conventional, water-based, low-viscosity writing fluids which comprise a dye dissolved in the water, which may or may not contain a dissolved water-soluble polymer to provide film-forming characteristics to a line that is to be drawn upon a substrate. It further is known to create writing fluids wherein a water insoluble dye is mixed with film-forming polymers, (such as polyvinyl, vinyl acetyl polymers, styrene-maleic anhydride copolymers, and alkylated vinylpyrrolidone copolymers,) in an organic solvent; the solution of dye and polymer are then dispersed in water to obtain an emulsion; and then the solvent removed to create a dyed polymer dispersion in water. Such prior formulations have been found to be suitable when used in certain writing fluid applications, though other writing fluid—and additional applications—require polymer characteristics beyond the limits of thermo-plastic resins.

OKA, U.S. Pat. No. 4,588,617, illustrates a technique where a bisphenol-A type glycidyl ether/amine copolymer system is used to produce cured epoxy resin spherical particles of less than 50 microns, by adding a water-soluble amine curing agent to an emulsion of uncured epoxy resin. One after-treatment is to dye the cured particles with an acid dye.

The present invention uses a solvent system to initially intermix dye and polymer molecules. The dyed particles also are not limited in size to that dictated by the size of the solid core material, as in U.S. Pat. No. 4,665,107. Further, the dye molecules are homogeneously permeating within a cross-linked polymer system and are available for use in a significantly stabilized form, that significantly resists penetration into and adhesion onto a substrate to which it may be applied. Alternatively, the uncured nanoparticles of the invention can be maintained in an aqueous solution and allowed to become crosslinked upon application, by external heat or the addition of a curing agent. After curing, the applied nanoparticles will maintain the stability typical of the thermoset polymer system.

The present invention also categorically is not an emulsion polymerization, since there are no primary particles which in turn are dispersed in a monomer (or mixture of monomers) in order to provide sites for a polymerization of polymer around those particles. An example of a prior art technique for producing colloidal sized, hydrophobic polymer particles which surround discrete particles of an inorganic material—through such an emulsion polymerization—is represented by SOLC neé Hajna, U.S. Pat. No. 4,421,660.

The use of an epoxy resin thermoset polymer system to polymer-coat solid core particles is disclosed in U.S. Pat. No. 4,665,107, so that the coated particles may be rendered stable after being applied to a substrate. However, the present improvements focus upon a polymer cross-linking system that also may create stable dyed polymer particles at any time, even in aqueous solution. Further, intermixed dye polymer particles will show a reduced tendency to settle from the continuous water phase, when compared to solid core materials, due to reduced density differentials of dyes to the continuous water phase. With the present invention, a selective delay to the step of cross-linking is enabled, even through predictable fluid rheology and surface morphology can still be achieved for optimum pre and post cure nanoparticle behavior. The product of the process ultimately is a cured, dyed polymer, but the circumstances of curing can be delayed even until after a film has been applied to a substrate.

BRIEF DESCRIPTION OF THE INVENTION

The present invention categorically employs dyes that are not soluble in water, and such dyes have a fade resistance generally known to be superior to water soluble dyes. Since the dyes are water insoluble, the dye molecules which permeate each cross-linked polymer particle do not tend to bleed out onto a substrate, such as paper, even if water is present within the substrate. Each embodiment of the present invention therefore comprises an aqueous dispersion, that is not dependent or limited to the solubility of any dye in water. Further, the present invention permits a large range of concentrations of dye that are stable and remain suspended in water. Nanoparticles may also easily be permeated with molecules of more than one dye. The control of the film-forming effects of a particular polymer system is the most significant variable, with the colorant behaving in a very predictable manner. Therefore, where colorant behavior in a resultant fluid is primarily dictated by the surface properties of the polymer, (without regard to the intrinsic characteristics of the intermixed dye molecules), the ability to have a selective thermoset cross-link option enables significantly more control over the final use.

A first process embodiment of the present invention involves admixing a thermoset polymer, curing agent (or second component) and dye in the initial solvent solution, with curing delayed until after solvent removal. A final fluid comprises a stable dispersion of cured, dyed nanoparticles in a continuous water phase.

A second process embodiment of the present invention involves delayed cross-linking by adding the curing agent (or second component) of the thermoset polymer system through a water phase surrounding the nanoparticles, after solvent removal is completed. The curing of the nanoparticles is delayed until application to a substrate and evaporation of the continuous water phase which forces the curing agent into intimate contact with the nanoparticles. Heat may be used to encourage cross-linking and adhesion of the nanoparticles to the substrate.

A third process embodiment is a variation of the first and second embodiments, wherein an initial polymer/solvent/curing agent system is created during the emulsification step, but the uncured nanoparticles are not cross-linked until after application to a substrate, and water evaporation relying upon applied heat required for water evaporation film formation and cross-linking.

In each embodiment, a water based dye ink is formed using a thermoset epoxy resin in an initial solvent or oil phase, with the hardener for the resin being added either in the solvent or in the water phase. The ink further is characterized by a water insoluble polymer that exists as stable colored nanospheres in an aqueous continuous phase, whether or not the nanospheres yet have been heat cured. In the second embodiment, as water is evaporated from a drawn line, the hardener is forced into intimate contact with the resin, a contact which normally may be prevented by an ionic surfactant. The hardener then diffuses into the resin, which is selected to have a low glass transition temperature (Tg) for this purpose, and proceeds to cross-link the polymer. In this way, an ink can be made which exhibits superior adhesion to different drawing surfaces as well as superior solvent resistance compared to conventional inks.

Dyes used as colorants in conventional water-based systems generally comprise relatively polar molecules, which enable the dye to have a relatively high solubility in water. However, the much lower relative stability, in terms of lightfastness of polar dyes as compared to non-polar dyes (which are appreciably soluble only in organic solvents), renders water soluble dyes not useful for many colorant applications. Water soluble dyes generally also have poor wet rub resistance, especially in applications where binders or film formers are not available for enhancing such properties, in inks used in such applications as rolling writer pens. Dyes also generally reduce the surface tension of the solvent in which they are dissolved, which may in turn adversely affect the wetting properties of the system when high color intensity, (i.e., high dye concentration) is required. The present system uses organic solvent-soluble dyes, which have been removed from an initial solvent solution, and integrated into polymer nanospheres, which are dispersed in an aqueous solution. The epoxy resin may be a film former or a nonfilm former, since dye/polymer nanospheres can be stabilized before or after application to a substrate, by the appropriate procedure.

Preferred applications of the present invention are colorants for writing fluids and printing inks. As stated above, the process allows more than one dye to be included in the nanosphere, though colored nanospheres containing different dyes can also be combined to achieve a stable dispersion of nanospheres with predictable rheological behavior and interaction with a substrate. This is achieved by the isolation of the dye from the continuous water phase and thus minimizing its influence on the behavior of the fluid and the polymer in the nanospheres. The polymer nanospheres will have the same size regardless of the molecular dye homogeneously dispersed therein and thus exhibit virtually identical behavior.

This will result in a more uniform color on a substrate without undesirable variation of color hue on different portions of the substrate, due to differential interaction or absorption of the colorant mix. Other advantages of a colorant made by this process include the ability to use the higher permanence solvent-soluble dyes as well as providing the opportunity to obtain the unique qualities typical of thermoset epoxy resins using a water-based system.

The polymer systems useful for the nanospheres in the present invention, are based on resins of the epoxy-type, which will react with a curing agent upon being thermoset, while in dispersion in a water continuous phase or after application to a substrate, and exposure to a heat level sufficient to bring the polymer matrix above its glass transition temperature. The preferred epoxy resins are those of the bis-phenol-A-glycidyl-ether type, with curing agents that include primary aliphatic amines.

With respect to writing fluids, prior attempts to create a writing fluid with nanoparticles of a dye and theroplastic polymer have been problematical. For example, when Savinyl Blue GLS dye was dissolved in methylene chloride with an alkylated vinylpyrollidone polymer, Ganex V-516 (GAF) and the solution dispersed in water to configure a writing fluid useful for fiber tip and roller ball pens, the final fluid had poor open pen time. When formamide was added to increase open pen time, the dye migrated, and the nanoparticles flocculated together. It is believed that the formamide may have caused the dye to leach out of the suspended particles and recrystalize in the water phase. Alternatively, the unacceptable flocculation may have resulted from formamide attacking the anionic surfactant, Aerosol OT-75 (American Cyanimid) which caused a destabilization in the particle dispersion. It also is possible that the formamide dissolved or swelled the Ganex V-516, causing the polymer to release dye molecules. Hence, dye molecules do not at all behave like a core of solid pigment, for example, and an entirely different polymer matrix reaction appears to be involved.

The higher level of incompatibility or reactivity between dye molecules and surfactants or open pen additives (such as formamide), directly relates to the stability of the aqueous colorant system over time. The present invention, through use of an epoxy system that cross links each nanosphere to enhance dye stability, solves a significant problem in the use of water insoluble dyes as colorants applied in a water phase.

The present invention can also be used for colorless materials possessiong the solubility characteristics stated above, to allow their use in a water-based system or to impart or enhance desired qualities such as rheological behavior or stability. Two examples of colorless materials are flourescent whiteners and ultraviolet absorbers. Fluroescent whiteners are materials used in the textile, paper, and plastics undustries which absorb invisible ultraviolet light, and re-emit it in the blue-violet wavelengths. The re-emitted color is efficient in masking the inherent undesirable yellow color of certain fabrics, paper and plastics, providing an appearance of greater whiteness. Ultraviolet absorbers are colorless materials also used to protect materials which are degraded by ultraviolet light by preferentially absorbing the harmful radiation.

Optimum performance of these ultraviolet active materials depends on a homogeneous distribution in or on the substrate, and resistance to removal. Ultraviolet active materials can be readily obtained which are water-soluble, or solvent-soluble and which may be supplied in dry form or as a dispersion of the dry from in water or in a water/solvent mixture. The water-soluble materials may lack permanence for many applications requiring exposure to water, while a dry, solvent-soluble material cannot be used in a water-based process or product.

The industry active in these materials has produced water-based dispersions of the solvent-soluble materials though these are gross dispersions of large and varied particle size exhibiting the problems of rapid settling in fluid systems and thus, non-uniform distribution when applied to substrates.

The present invention can be used to provide optimum performance to these ultraviolet active materials, in regards to stability, permanence, and uniform distribution by including the materials in the polymer nanospheres, cross-linked prior to or after application as is desired.

The process can be characterized as dissolving a dye in a solution of organic solvent and an epoxy resin type polymer, which requires a curing agent in order to create a resultant nanosphere that will crosslink through the action of the curing agent. Surfactants may be used to assist in dispersing the dye/polymyer/solvent solution, and the relative solubility of the dye in the solvent has a substantial effect upon the ability of the dye molecules to homogeneously permeate the polymer system. The dye may be in a concentration range of 1% to 50% by weight of solvent, and any surfactant would be used in minimal amounts, and probably less than 10%, by weight, of surfactant relative to dye. The organic solvent chosen must have limited solubility in water, typically less than 20%. The initial mixing step to dissolve dye and polymer within the solvent may be accomplished by a variety of techniques, suitable for a low viscosity medium, such as high speed dispersion mixer, ultrasonic probe vibration, and the like. The primary requirement is that the dye be dissolved in the solvent, and the epoxy resin also be dissolved so as to make a solvent/polymer/dye intermediate mixture that is characterized by a homogeneous mixing of all elements, in solution.

After the initial mixing step, the intermediate mixture may be added to water, in a concetration of 1%–50% by weight, and then emulsified. The preferred technique is a high speed dispersion by homogenization or ultrasonic emulsification, and it also is preferred that the interfacial tension between organic solvent in water is to be less than 10 dynes/centimeter, and preferably less than 5 dynes/cm. Depending upon the total interaction of components, the addition and dispersing step may require a further surfactant, directly in the water phase, in order to reduce the interfacial tension to the desired level. As a matter of control, the average liquid droplet size in the resulting emulsified dispersion preferably is less than 4 micrometers, and stable for at least 2 hours after preparation.

The solvent removal step preferably is through a distillation, and preferred technique is to use a rotovapor, or other technique for direct evaporation of solvent into the air, whereby substantially all solvent is distilled or extracted away in the final fluid mixture. If the mixing and dissolution step has resulted in a truly homogeneous solution, and the dispersing step has created an emulsion with discontinuous phase that is sub-micron in size and spherical with respect to the aqueous continuous phase, the danger of phase separation or flocculation upon distillation is a direct function of concentration of dyed polymer to water. After all solvent has been removed, the aqueous suspension of dyed polymer nanoparticles further may be concentrated by evaporation of water, at a rate which is limited only by the inherent stability of the aqueous suspension fluid.

DESCRIPTION OF PREFERRED EMBODIMENT

The present invention contemplates different procedures for an organic solvent with a water insoluble polymer (capable of a thermosetting cure reaction) to be combined with a water insoluble dye and a curing agent. Subsequent removal of the organic solvent, as by evaporation, in each case produces a stable, sub-micron dispersion of dyed polymer particles in a continuous water phase. At least three methods are identified hereafter to create a thermoset polymer system with unique application characteristics.

Examples 1, 6 and 7 illustrate a first method whereby a dispersion of crosslinked polymer particles containing the active molecular dye can be made, by emulsifying an organic solvent phase containing both an epoxy resin and curing agent, with subsequent reaction of the polymer system occurring after solvent removal. The heat curing step occurs to the nanoparticles while still in a continuous aqueous phase.

Examples 2 and 4 teach a method to produce a dispersion of polymer particles containing an active molecular dye, wherein a second component of the thermoset polymer system is dissolved in a continuous water phase, so that curing occurs only after application to a substrate and removal of water. This method produces a crosslinked dyed polymer film on the substrate with superior substrate adhesion, as compared to thermoplastic ink systems. Examples 2 and 4 also teach that the particle dispersion systems can be made with different ionic charges, dependent on a desired application.

Examples 3 and 5 teach a third method to produce a dispersion of polymer particles containing said active ingredient which will produce a cross-linked polymer film containing said active ingredient only after application and removal of the water phase, as in examples 2 and 4. In this method, both components of the polymer system are in the nanospheres, and no additional reactants are needed to produce a crosslinked film.

EXAMPLE 1

A. CROSSLINKED PARTICLE DISPERSION

A mixture is made of 30.0 g of the organic solvent, methylene chloride, a resin/curing agent system comprising of 2.0 g of the bisphenol-A glycidyl ether type epoxy resin, Epi-Rez 510 (Celanese) and 0.6 g of the amine curing agent Versamine 1-70 (Henkel Corp.), 0.2 g of the nonionic surfactant Surfynol TG (Air Products) and 0.4 g of nonionic surfactant Lecithin WD (Troy Chemical). Into this mixture is dissolved 4.0 g of the solvent soluble dye, Sudan Black X60 (BASF-solvent black 3).

Upon complete dissolution of the dyestuff, the solvent mixture is emulsified into 50.0 g of deionized water using an ultrasonic probe until microscopic examination reveals the solvent phase emulsion drops to be relatively uniform and below 1.0 micron diameter.

The resulting fluid is then mixed on a magnetic stirrer until all the methylene chloride is removed from the fluid by evaporation, to create a stable dispersion of dyed polymer particles in a continuous water phase.

The system can then be heated at 60 degrees C. for the period of 5 hours to crosslink the polymer particles in suspension. This will result in dyed polymer particles which will not form a continuous film when applied to a substrate due to the high Tg of the cross/linked encapsulating polymer, and will possess little physical interaction or entrapment in the substrate surface due to the particles unique spherical surface morphology. The particles, therefore, should be more easily removed by appropriate erasure techniques than conventional dyebased or pigmented writing fluids. This is especially true on absorbent surfaces.

EXAMPLE 2

B. TWO COMPONENT-CROSSLINKING AFTER APPLICATION

This example illustrates a classic epoxy system approach. A catalyst is dissolved in the water, and surface tension forces the wet catalyst into intimate contact with the resin, as water evaporates after application.

A mixture is made of 30.0 g of the organic solvent methylene chloride, bisphenol-A glycidyl ether type epoxy resins in the amounts of 1.0 g of Epi-Rez 520 (Celanese) and 2.0 g of Epi-Rez 510 (Celanese), 0.1 of the nonionic surfactant Surfynol TG (Air Products) and 0.30 g Aerosol OT-75 (American Cyanamid). Into this mixture is dissolved 4.0 g of the solvent soluble dye Sudan Black X60 (BASF-solvent black 3).

Upon complete dissolution of the dyestuff, the solvent mixture is emulsified into 40.0 g deionized water using an ultrasonic probe until microscopic examination reveals the solvent phase emulsion drops to be relatively uniform and below 1 micron diameter.

The resulting fluid is then stirred on a magnetic stirrer until all the methylene chloride is removed by evaporation to create a stable dispersion of polymer nano-particles containing the solvent dye in a homogeneous mix, stable in a continuous water phase.

The resulting dispersion fluid can be used as a writing fluid, and can be made thermosetting by the addition of 10 phr (parts per hundred resin) of Millamine 5260 (Milliken Chemical) to the fluid which will crosslink the polymer only after the fluid is applied to the substrate, and the water removed. In direct contrast to Example 1, this ink will exhibit high adhesion to substrates.

EXAMPLE 3

C. ONE COMPONENT-SELF-CROSSLINKING AFTER APPLICATION

This example illustrates the use of a reactive copolymer, under the third embodiment of the invention.

A solvent mixture is made using 30.0 g of the organic solvent, methylene chloride, 1.5 g of the acrylic polymer Carboset 525 (B. F. Goodrich), 0.5 g of the bisphenol-A glycidyl ether epoxy resin Epi-Rez 510 (Celanese), 0.1 g of the nonionic surfactant Surfynol TC (Air Products), and 0.3 g of the anionic surfactant Aerosol OT-75 (American Cyanimid). Into this mixture is dissolved 4.0 g of the solvent soluble dye Savinyl Blue GLS (Sandoz Chemicals-solvent blue 44).

Upon complete dissolution of the solvent dyestuff in the solvent mixture, the solvent mixture is emulsified into 40.0 g of deionized water using an ultrasonic probe until microscopic examination reveals the solvent phase emulsion drops to be relatively uniform and less than 1 micron diameter.

The resulting fluid is then stirred on a magnetic stirrer until all the methylene chloride is removed by evaporation, to create a stable dispersion of dyed polymer particles in a continuous water phase.

The resulting dispersion fluid can then be concentrated and/or formulated for use as a colorant in a writing or printing ink, and will be self-film forming upon application to the substrate with the application of heat. The heat source may also be UV light or oxygen exposure, for some period of time. In addition to a simple heat-dependent reaction, some oxidation triggering mechanism also is possible.

EXAMPLE 4

D. TEXTILES-FABRIC FINISHES CONTAINING OPTICAL BRIGHTENERS

This example uses a polymer system as in Example 2 with a cationic emulsifier and a different type of molecular active ingredient for a particular application program.

A mixture is made of 30.0 g of the organic solvent methylene chloride, bisphenol-A glycidyl ether epoxy resins in the amounts of 4.8 g of Epi-Rez 520 (Celanese), and 7.2 g of Epi-Rez 510 (Celanese), and 0.4 g of the nonionic surfactant Surfynol TG (Air Products). Into this mixture is dissolved 0.6 g of the optical brightener Uvitex OB (Ciba-Geigy), "a colorless dye", which flouresces down toward the blue region typically. Optical brighteners and fluorescent whitening agents are described in McCutcheons, EMULSIFIERS & DETERGENTS, (1984 Annuals), pages 151–153, and also are categorized in The Condensed Chemical Dictionary, (10th Ed. Van Nostrand) page 760.

A separate water mixture is made using 50.0 g deionized water 1.0 g of a cationic surfactant Hyamine 3500 (Lonza), 0.1 g of a water soluble polymer PVP K-15 (GAF), and 0.6 g of Acetic Acid 98%. Upon complete dissolution of the optical brightener in the solvent mixture, the solvent mixture is emulsified into the water mixture using an ultrasonic probe until microscopic examination reveals the solvent phase emulsion drops to be relatively uniform and below 1 micron diameter.

The resulting fluid is then stirred on a magnetic stirrer until all the methylene chloride is removed by evaporation, to create a stable dispersion of polymer particles, containing optical brightener molecules in a homogeneous mix with the polymer, in a continuous water phase.

The resulting dispersion fluid can be applied to textiles by padding techniques or after proper formulating, by printing methods.

With the addition to the fluid of 81 phr (parts per hundred resin) of the modified water soluble aliphatic amine, Epi-Cure W50-8535 (Celanese), the particles will crosslink upon application to the fabric, drying, and curing at the appropriate temperature.

The inclusion of the optical brightener in the particles bonded to the fabric surface will enhance the whiteness of the fabric material.

EXAMPLE 5

E. CLEAR OVERCOAT FOR PRINTED SUBSTRATES-HIGH GLOSS WITH OPTICAL BRIGHTENER

This example uses the same polymer system as in Example 3, but with a different molecular active ingredient, for a unique purpose. A mixture of 30.0 g of the organic solvent methylene chloride, 3.0 g of the acrylic polymer Carboset 525 (B. F. Goodrich), 1.0 g of the bisphenol-A glycidyl ether epoxy resin Epi-Rez 510 (Celanese), 0.1 g of the nonionic surfactant Surfynol TG (Air Products), and 0.3 g of the anionic surfactant, Aerosol OT-75 (American Cyanimid) is made. Into this mixture is dissolved 0.4 g of the optical brightener Uvitex OB (Ciba-Geigy).

Upon complete dissolution of the optical brightener in the solvent mixture, the solvent mixture is emulsified into 50.0 g of deionized water using an ultrasonic probe until microscopic examination reveals the solvent phase emulsion drops to be relatively uniform and below 1 micron diameter.

The resulting fluid is then stirred on a magnetic stirrer until all the methylene chloride is removed by evaporation. The dispersion fluid can be used to overcoat printed substrates and upon application of heat above the Tg of the polymer mix, the polymer particles will form a clear, glossy, continuous film which will crosslink. The inclusion of the optical brightener in the polymer film will also enhance the whiteness of the unprinted areas on the substrate. This example has application in the field of flexographic printing, wherein water-based inks commonly are employed.

EXAMPLE 6

F. ENVIRONMENTAL FRAGRANCES-CONTROLLED RELEASE

This example uses the same polymer system as in Example 1, but with a different active ingredient and a unique application.

A mixture is made of 30.0 g of the organic solvent methylene chloride, a resin/curing agent system comprising of 2.0 g of the bisphenol-A glycidyl ether epoxy resin, Epi-Rez 510 (Celanese, and 0.6 g of the amine curing agent Versamine I-70 (Henkel Corp.), 0.2 g of the nonionic surfactant Surfynol TG (Air Products) and 0.4 g of the nonionic surfactant Lecithin WD (Troy Chemical). Into this mixture is dissolved 1.0 g of Oil of Lavender R-152 (Reynaud Ltd.) essential oil.

The solvent mixture is then emulsified into 50.0 g deionized water using an ultrasonic probe until microscopic examination reveals the solvent phase emulsion drops to be relatively uniform and less than 1 micron diameter.

The resulting fluid is then mixed on a magnetic stirrer until all the methylene chloride is removed by evaporation, to create a stable dispersion of polymer molecules intermixed with molecules of the essential oil as micron sized drops, in a water continuous phase. The fluid can then be heated at 40 degrees C. for the period of 8 hours in a closed container to cross-link the polymer particles.

This will result in a fluid comprising of sub-micron particles made of an essential oil molecule in a crosslinked polymer matrix, and dispersed in a water phase. Upon application of the fluid and drying of the water, the release of the fragrance will be controlled by its retarded diffusion from the polymer matrix. Such fluids could be used in air fresheners and as scents in consumer products.

EXAMPLE 7

INK JET FLUID

An organic solvent mixture of 15.0 g methylene chloride and 0.10 g of the anionic surfactant, Aerosol OT-75 (American Cyanimid) is made. Into this mixture is dissolved 0.50 g of the solvent soluble styrene/maleic anhydride copolymer resin, SMA 3000A (Arco Chemical) and 0.50 g of the epoxy resin of the bisphenol-A glycidyl ether type, Epi-Rez 510 (Celanese). After the resins are completely dissolved, 1.0 g of the solvent soluble dyestuff Sudan Black X60 (BASF) is completely dissolved into the solvent/resin mixture.

The fluid is then emulsified in 24.0 g of deionized water until the solvent phase emulsion drops are uniform and below 2.0 microns in diameter.

The resulting fluid is then mixed on a magnetic stirrer until the methylene chloride is removed by evaporation. With continued and constant stirring, the fluid is heated to 70 degrees and held at that temperature for 6 hours to complete the cure of the polymer system.

The resulting fluid is comprised of a stable dispersion of dyed polymer nanoparticles in continuous water phase. Due to the crosslinked nature of the polymer system, the particles possess a high temperature resistance and nonreactive nature, and can be formulated with humectant materials such as glycerin and ethylene glycol for use in an ink jet system. The nanoparticles alternatively may be configured so as to adapt one or more of its physical characteristics when subjected to the heat and pressure of an ink jet delivery system.

While we have described preferred embodiments, the invention is to be limited solely to the scope of the appended claims.

We claim:

1. In a process for producing a thermosetting colorant comprising a stable aqueous suspension of nanoparticles of crosslinked thermosetting polymer, wherein water-insoluble dye molecules are intermixed in a polymer matrix, according to a process comprising the steps of:

A. Mixing together an organic solvent, a polymer comprising an epoxy resin that is soluble in said solvent but substantially insoluble in water and dye which is soluble in said solvent and substantially insoluble in water to form a homogeneous mixture, wherein said solvent is characterized by a vapor pressure higher than water and said mixing is continued until said dye and polymer are molecularly intermixed to form a dyed polymer that substantially is dissolved within said solvent; and B. Dispersing by adding said solvent/polymer/dye solution to water, in a concentration range of 1.0 percent to 50.0 percent, by weight, and agitating until an emulsion results wherein droplets of solvent/polymer/dye less than 10 microns in diameter comprise a discontinuous phase in water as the continuous phase, wherein said dispersing step is done under conditions where interfacial tension between the organic solvent and the water is less than approximately 20 dynes/cm; and C. Removing substantially all of said solvent to define a resulting fluid comprising an aqueous suspension of dyed polymer nanoparticles;

the improvement which comprises the step of combining dyed polymer with a curing agent by contacting curing agent in a liquid phase with polymer, before or after said dispersing step, to create a final fluid adapted to be cross-linked selectively upon applying heat to raise the temperature of the dyed polymer and curing agent combination above its glass transition temperature.

2. The improvements according to claim 1, wherein, in said mixing step, the polymer is soluble to less than 5 percent, in water, the solvent is soluble to less than 20 percent in water, and said curing agent is water soluble, wherein further said curing agent migrates through a continuous aqueous phase to combine with the surface of each dispersed polymer particle.

3. The improvements according to claim 2, wherein, in said mixing step, the dye comprises non-polar molecules and the concentration, by weight, of dye in solvent is between 1 percent and 50 percent wherein, further, the concentration ratio, by weight, of polymer to dye for each submicron sized particle is between 0.1 and 10.0, and the polymer has a viscosity of less than 200 centipoise when dissolved in a solvent which is selected from the group consisting of ethyl acetate, methyl isobutyl ketone, and methylene chloride.

4. The improvements according to claim 2, wherein, in said mixing step, the concentration, by weight, of dye to solvent is between 1.0 percent and 20 percent, said polymer has a viscosity of less than 200 centipoise when dissolved in said solvent and said dispersing step is done ultrasonically, until substantially each droplet of discontinuous phase comprises a submicron sized polymer matrix with dye molecules homogeneously dispersed therein.

5. The improvements according to claim 2, wherein, said dyed polymer droplets are adapted for use in treating textiles, said polymer system comprises a thermosetting epoxy resin which requires a curing agent, said dispersing step comprises adding a surfactant, and said curing agent is added to the continuous aqueous phase in order to contact the dispersed polymer droplet surfaces, wherein said cross-linking step occurs when heat is applied to the droplets substantially simultaneously as the dyed polymer is being applied as a film upon a textile surface, whereby the dyed polymer will be thermoset as a film and adhere directly upon said textile surface.

6. The improvements according to claim 5 wherein a cationic surfactant is used in said dispersing step and said polymer and curing agent combining step further comprises adding said water soluble curing agent with said particles through a separate bath, after said particles have been applied as a film upon a substrate, and some or all of the water of the final fluid has been removed.

7. A material for treating textiles as made by the process of claim 5.

8. A material for treating textiles as made by the process of claim 6.

9. The improvements according to claim 1, wherein, in said mixing step, the polymer is soluble to less than 20 percent in water, said curing agent is soluble in said solvent but substantially insoluble in water, and said polymer and curing agent combining step is done prior to said dispersing step.

10. The improvements according to claim 9, wherein said dyed polymer is crosslinked as discrete droplet particles in the final fluid aqueous suspension.

11. The improvements according to claim 10, wherein said dye is useful as an ink of the type used in ink jet printers, and the final fluid is combined with a humectant material to define an ink jet fluid.

12. The improvements according to claim 9, wherein said dyed polymer is crosslinked substantially simultaneously as the final fluid is applied to a substrate to define a film of dyed polymer.

13. The improvements according to claim 12, wherein heat is applied after application both to cure said dyed polymer as a film directly upon the substrate and to remove some of all of the water out of said final fluid.

* * * * *